(12) United States Patent
Rijskamp et al.

(10) Patent No.: US 10,130,206 B2
(45) Date of Patent: Nov. 20, 2018

(54) BEVERAGE MACHINE

(71) Applicant: KONINKLIJKE PHILIPS N.V., Eindhoven (NL)

(72) Inventors: Peter Rijskamp, Eindhoven (NL); Rodin Enne Bruinsma, Eindhoven (NL); Hendrikus Lodewijk Joseph Franciscus Holten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 176 days.

(21) Appl. No.: 15/103,571

(22) PCT Filed: Dec. 17, 2014

(86) PCT No.: PCT/EP2014/078109
§ 371 (c)(1),
(2) Date: Jun. 10, 2016

(87) PCT Pub. No.: WO2015/101490
PCT Pub. Date: Jul. 9, 2015

(65) Prior Publication Data
US 2016/0309943 A1    Oct. 27, 2016

(30) Foreign Application Priority Data

Dec. 31, 2013 (EP) .................................... 13199872

(51) Int. Cl.
*A47J 31/36* (2006.01)
*A47J 31/06* (2006.01)
*A47J 31/44* (2006.01)

(52) U.S. Cl.
CPC ....... *A47J 31/0668* (2013.01); *A47J 31/0647* (2013.01); *A47J 31/0684* (2013.01);
(Continued)

(58) Field of Classification Search
CPC ................ A47J 31/4482; A47J 31/0647; A47J 31/0668; A47J 31/0684; A47J 31/3676; A47J 31/3685
(Continued)

(56) References Cited

U.S. PATENT DOCUMENTS 5,634,394 A * 6/1997 Cortese ............... A47J 31/0684
99/287
7,726,233 B2 * 6/2010 Kodden ................. A61B 1/018
99/284

(Continued)

FOREIGN PATENT DOCUMENTS

EP    1308115 A1    5/2003
EP    1522242 A1    4/2005
(Continued)

OTHER PUBLICATIONS

WO 96/27316 (Levi et al.) Sep. 1996.*

*Primary Examiner* — Reginald L Alexander (57) ABSTRACT

A beverage machine includes a brewing unit with a main body defining a hollow for receiving different types of portable pad and/or capsule holders, and a lid connected to the main body for opening and closing the hollow. The beverage machine further includes first and second holders for receiving first and second types of a pad or capsule, respectively. The shape of the hollow is configured such that it may either receive the first or second holder. The lid includes (i) a first sealing member configured to seal a first brewing chamber between the lid and the first holder, when the first holder is inserted into the hollow, and (ii) a second sealing member which is different from the first sealing member and is configured to seal a second brewing chamber between the lid and the second holder, when the second holder is inserted into the hollow.

19 Claims, 7 Drawing Sheets

(52) U.S. Cl.
CPC ....... *A47J 31/3685* (2013.01); *A47J 31/4482* (2013.01); *A47J 31/3676* (2013.01)

(58) Field of Classification Search
USPC .................................... 99/284, 295, 289 R
See application file for complete search history.

(56) References Cited

U.S. PATENT DOCUMENTS

| | | |
|---|---|---|
| 2007/0169640 A1 | 7/2007 | Sato |
| 2013/0133522 A1 | 5/2013 | Denisart |
| 2014/0083302 A1* | 3/2014 | Aardenburg ........ A47J 31/0647 99/295 |
| 2015/0033947 A1* | 2/2015 | Van Der Kamp .. A47J 31/0621 99/283 |

FOREIGN PATENT DOCUMENTS

| | | |
|---|---|---|
| EP | 2071986 B1 | 2/2012 |
| JP | 2015039408 A | 3/2015 |
| WO | 2009022364 A2 | 2/2009 |
| WO | 2012123003 A1 | 9/2012 |
| WO | 2013079814 A1 | 6/2013 |

\* cited by examiner

BEVERAGE MACHINE

This application is the U.S. National Phase application under 35 U.S.C. § 371 of International Application No. PCT/EP2014/078109, filed on Dec. 17, 2014, which claims the benefit of International Application No. 13199872.6 filed on Dec. 31, 2013. These applications are hereby incorporated by reference herein.

FIELD OF THE INVENTION

The present invention relates to a beverage machine, such as e.g. a coffee and/or espresso coffee machine. The present invention particularly relates to a single-serve automatic or semi-automatic coffee and/or espresso coffee machine. Further, the present invention relates to a portable capsule holder for a single-serve beverage machine.

BACKGROUND OF THE INVENTION

Automatic or semi-automatic single-serve coffee and/or espresso coffee machines become more and more popular. The main advantages of these single-serve coffee machines are, compared to fully automatic coffee machines (bean to cup coffee machines), their reduced complexity as well as their more hygienic usage. Due to their reduced complexity compared to fully automatic coffee machines, such single-serve coffee machines may be offered to the consumer at comparatively affordable prices. Single-serve coffee machines are also easy in handling for the consumer. Furthermore, both the time needed to brew coffee is reduced and the brewing process is simplified by eliminating the need to measure out portions, flavourings, and additives from large bulk containers.

Single-serve coffee machines rely on the basic principle to extract the coffee from grinded coffee or coffee powder that is encapsulated within a pad or capsule. These pads or capsules are inserted into a sealed brewing chamber of a brewing unit of the machine. After that, hot or cold water is injected or diffused into the brewing chamber and into the pad or capsule, so that coffee may be extracted therefrom. The used pads or capsules may then be thrown away. Depending on the ingredients enclosed within the pads or capsules, different types of coffee and/or espresso coffee recipes and flavours may be dispensed. It is even possible to extract tea, hot chocolate, soups or other types of hot or cold beverages with these types of single-serve machines. Therefore, these machines are herein generally denoted as beverage machines.

An example of such a machine is sold by the applicant under the name Senseo. This type of machine uses soft pads in which the extractable food product is enclosed. These soft pads are sometimes also denoted as pods.

However, other suppliers of single-serve coffee machines make use of differently shaped or sized coffee pads or differently shaped and sized capsules. These differently sized and shaped pads and capsules do not only require different receptacles within the coffee machine that are exclusively adapted to the shape and size of the specific pad or capsule. The different machine types also differ from a technical point of view. Machines using capsules usually use higher pressures (around 5 to 19 bar) than machines using the bigger and softer pads, like the Senseo machine which uses pressures of around 1.2 to 1.9 bar. The technical design of the brewing unit therefore differs for these different machine types significantly.

When someone would like to use different types of pads or capsules, different types of appliances are needed. This would mean different machines each with its specific way of working and consuming space in the kitchen.

WO 2013/079814 A1 and US 2013/0133522 A1 refer to single-serve coffee machines that allow using differently sized and shaped pads and capsules. Comparatively complicated adapters are used therein, one for each different type of pad or capsule. These adapters are relatively uncomfortable in handling. The adapters usually comprise a plurality of different parts that have to be assembled together in a correct manner by the consumer each time a new capsule or pad is inserted into one of the different adapters. Apart from that, a correctly balanced force distribution within the brewing unit and a proper sealing of the brewing chamber is still hard to guarantee.

Thus, there is still room for improvement.

SUMMARY OF THE INVENTION

It is an object of the present invention to provide an improved single-serve beverage machine that may be used with different kinds of pads and capsules. Particularly, the sealing and the force distribution within the brewing chamber shall be improved independent of the type of capsule or pad that is used. It is furthermore an object to provide an improved capsule holder for such a beverage machine.

In a first aspect of the present invention, a beverage machine is presented that comprises:

a brewing unit with (i) a main body defining a hollow for receiving different types of portable pad and/or capsule holders, and (ii) a lid connected to the main body for opening and closing the hollow;

a first holder for receiving a first type of pad or capsule which encapsulates an extractable food product; and a second holder for receiving a second type of pad or capsule which encapsulates an extractable food product;

wherein either the first or the second holder may be selectively placed in the hollow, and wherein the lid comprises (i) a first sealing member which is configured to seal a first brewing chamber between the lid and the first holder, when the first holder is inserted into the hollow, and (ii) a second sealing member which is different from the first sealing member and configured to seal a second brewing chamber between the lid and the second holder, when the second holder is inserted into the hollow.

In a second aspect of the present invention, a portable capsule holder for the above mentioned beverage machine is presented, wherein the capsule holder comprises:

a base body which comprises a substantially cup-shaped capsule receptacle for receiving a capsule that encapsulates an extractable food product;

a holder lid for opening and closing the capsule receptacle; and an ejection mechanism for mechanically ejecting a capsule that is received in the receptacle.

Preferred embodiments of the invention are defined in the dependent claims. It shall be understood that the claimed portable capsule holder has similar and/or identical preferred embodiments as the claimed beverage machine, and vice versa, and as defined in the dependent claims.

The presented beverage machine may be particularly realized as a coffee and/or espresso coffee machine. In practice, the invention may, for example, be applied in a Senseo machine that is modified in such a way that not only sof pads may be used within it, but also capsules, as this will be illustrated in detail further below. The machine thereto comprises at least two separate portable holders which may be selectively placed in one and the same receptacle that is defined by a hollow within the machine.

The first holder is preferably configured to receive a soft pad with an extractable food product, whereas the second holder is preferably configured to receive a capsule. Due to the different concepts of such pads and capsules, this enables to brew different types of "regular" coffees and/or espresso coffees with one and the same machine. If, for example, the consumer wants to have a "regular" coffee, the consumer may use a soft pad and insert it into the brewing unit together with the first holder. If on the other hand, the consumer wants to have an espresso coffee, the consumer might rather use a capsule and insert it into the brewing unit together with the second holder. This means that either the first holder with a pad or the second holder with a capsule is used.

In contrast to the machines presented in the prior art documents mentioned in the opening paragraph (WO 2013/079814 A1 and US 2013/0133522 A1), the herein presented machine particularly provides an improved sealing and pressure distribution concept as well as it allows an easier handling of the separate parts for the consumer. The handling of the herein presented machine is easier for the consumer, since the consumer only has to choose the correct portable holder, insert the pad or capsule in the chosen portable holder, then insert the portable holder together with the pad or capsule always in one and the same receptacle within the main body of the brewing unit, and finally close the lid of the brewing unit and start the brewing process (e.g. by pressing a button).

No complicated pre-assembly of a multi-part adapter is necessary as according to the machines presented in the mentioned prior art documents. One of the key features of the herein presented machine is that the different pad/capsule holders themselves do not form a sealed chamber like the adapters shown in the mentioned prior art documents, but instead form the sealed brewing chamber together with the lid that is connected to the main body of the brewing unit. The lid thereto comprises different sealing members, a first sealing member which is configured to seal a first brewing chamber between said lid and the first holder, when the first holder is inserted into the hollow of the brewing unit, and a second sealing member which is configured to seal a second brewing chamber between said lid and the second holder, when the second holder is inserted into the hollow of the brewing unit. These two different sealing members are preferably integrated into the lid. The terms "first brewing chamber" and "second brewing chamber" are herein only used to differentiate between two differently sized and shaped brewing chambers that are formed by either one of the two holders together with the lid of the brewing unit. In other words, if the first holder is inserted into the brewing unit, this first holder cooperates together with the lid of the brewing unit to form the first brewing chamber, as soon as the lid is closed. If the second holder is inserted into the brewing unit, the second holder cooperates together with the lid to form the second brewing chamber, as soon as the lid is closed. This means that depending on which of the two holders are inserted into the brewing unit, two differently sized and shaped brewing chambers result therefrom. The first brewing chamber is sealed by means of the first sealing member and the second brewing chamber is sealed by means of the second sealing member that is different from the first sealing member.

In still other words, the first brewing chamber is defined in a space between the lid, the first holder and the first sealing member, when the first holder is inserted into the hollow, and the second brewing chamber is defined in a space between the lid, the second holder and the second sealing member, when the second holder is inserted into the hollow.

According to a preferred embodiment of the machine, the first and the second sealing member are arranged on a bottom side of the lid, wherein the first sealing member encircles a larger area of the bottom side than the second sealing member. Both sealing members preferably form a closed loop. The first and the second sealing member are preferably realized as differently sized circular sealing rings, i.e. sealing rings having different diameters. However, the sealing members may also have other shapes, such as e.g. a rectangular or a quadratic shape.

If the first sealing member encircles a larger area, then the second sealing member, this means that the first brewing chamber, which is sealed by the first sealing member when the first holder is inserted, is larger or has a larger diameter than the second brewing chamber, which is sealed by the second sealing member when the second holder is inserted into the brewing unit. It also follows therefrom that the first holder, which is preferably used for pads, is larger or has a larger diameter than the second holder, which is preferably used for capsules. These differently sized brewing chambers lead to the advantage that depending on which type of portable holder is inserted into the brewing unit, the pressure within the brewing chamber (first brewing chamber verses second brewing chamber) is so to say automatically adapted. The first holder, which is designed for pads, may thus preferably be used for brewing "regular" coffee, where lower pressures of around 1.2 to 1.9 bar are used. The second smaller holder, which is designed for capsules usually having smaller diameters than the pads, may preferably be used for brewing espresso coffee where higher pressures of around 5 to 19 bar are used.

The above mentioned pressure difference that results from the differently sized brewing chambers is especially needed since high pressures of around 5 to 19 bar within the larger brewing chambers that are usually used for soft pads would significantly increase the force on the lid. This could lead to a mechanical instability, to leakages or even to a destruction of the brewing unit. However, since the second brewing chamber is chosen to be smaller, the overall force that is applied to the brewing unit if the smaller second holder is inserted is still almost the same as if the first larger holder is inserted into the brewing unit. In other words, even though different pressures may be created within the first compared to the second brewing chamber, the pressure on the lid of the brewing unit does not increase too much if the smaller second holder is inserted into the brewing unit.

Due to the different sizes of the brewing chambers, the liquid flow behaviour is also very different in the first brewing chamber compared to the second brewing chamber. This is also advantageous, since the liquid flow behaviour for extracting coffee out of a soft pad should be different from the liquid flow behaviour that is needed to extract espresso coffee out of a capsule. If an espresso capsule was placed in a brewing chamber that is as large as a brewing chamber for soft pads, and if then low water volumes needed for espresso are used, there would be a significant heat loss and as a result a cold espresso.

Therefore, it should be clear that the first holder (pad holder) only engages with the first larger sealing member when being inserted into the brewing unit, whereas the second holder (capsule holder) preferably only engages with the second smaller sealing member when being inserted into the brewing unit. However, since the two different sealing members are already integrated into the lid, the consumer might not even recognize this fact, as the consumer only has to insert the respective holder and close the lid, so that the correct sealing member will automatically engage with the respective holder.

According to a further embodiment, the first and the second sealing member are concentrically arranged to one another. A concentrical arrangement allows a symmetrical design of the first and the second holder, and thus also a symmetrical design of the first and the second brewing chamber. This leads to an optimal force distribution.

According to a further embodiment, the lid comprises at least one liquid supply opening that is surrounded by the second sealing member. Preferably, a plurality of liquid supply openings is provided in this area of the lid. In the area between the first and the second sealing member, no liquid supply openings are provided. This means that independent on what holder is inserted into the brewing unit, the same liquid supply openings are used to inject the liquid (preferably hot water) into the respective brewing chamber. Since the second sealing member has no sealing function when the first larger holder is inserted into the brewing unit, the injected liquid may thus be distributed over a larger area, leading to lower pressures that are suitable for brewing "regular" coffee. If the second smaller capsule holder is inserted, the second brewing chamber will be sealed by means of the second smaller sealing member, such that the injected liquid is distributed over a smaller area, leading to higher pressures that are suitable for brewing espresso coffee.

The first and the second sealing member are preferably arranged on a bottom side of the lid, wherein the at least one liquid supply opening is arranged at said bottom side, and wherein a plurality of protrusions is arranged on said bottom side at least in between the first and the second sealing member.

The protrusions are in other words arranged in the space between the first and the second sealing member where no liquid supply opening is arranged. The protrusions may be realized as small nipples that stick out of the bottom side of the lid. The term "bottom side" of the lid shall denote the side of the lid that faces towards the brewing chamber when the lid is closed. The protrusions mainly function as distance elements that prevent a soft pad inserted in the first holder from sticking to the bottom side of the lid when the lid is opened after the coffee production. This facilitates to remove the used soft pads. It also allows the injected liquid to be equally distributed throughout the first brewing chamber when pads are used for brewing coffee.

The lid itself is preferably connected to the main body of the brewing unit via a hinge. The lid may thus be easily opened and closed.

While the foregoing paragraphs mainly focussed on the design of the lid, the different holders that may be inserted into the brewing unit as well as to the different sealing members, it should be clear that the beverage machine commonly also comprises: a liquid supply for supplying liquid to the first or the second brewing chamber, respectively; a heater for heating the liquid before being supplied to the brewing chamber; and a controller for controlling the liquid supply and/or the heater. Depending on the desired recipe, the controller may specifically control the amount of liquid, the liquid flow rate and/or the heating power of the heater.

According to a further embodiment, the beverage machine may additionally comprise a detector for detecting which type of holder, the first or the second holder, is inserted into the hollow of the brewing unit. In this case, the controller may be configured to change the parameters of the liquid supply and/or the heater depending on the detected type of holder.

As already mentioned above, the first holder that is preferably designed for pads that are suitable for brewing coffee, whereas the second holder is preferably designed for capsules that are especially suitable for brewing espresso coffee. As also mentioned above, brewing "regular" coffee requires different (lower) pressures than brewing espresso coffee. In addition to the automatic pressure adaptation due to the differently sized sealing members and brewing chambers, the controller may thus actively change the pressure and/or the liquid flow rate depending on the type of the selected recipe. For example, if a coffee shall be brewed and the first holder is inserted including a pad, the controller may control the liquid supply to supply a larger amount of liquid at a higher flow rate. If an espresso shall be brewed and the second holder including a capsule is inserted into the brewing unit, the controller may control the liquid supply to supply a smaller amount of liquid at a lower flow rate.

The detector for detecting the type of holder that is inserted into the brewing unit may be realized in a plurality of different ways, e.g. as an optical, inductive or mechanical detector. The easiest way would be to include a small button that is only activated if the first larger holder is inserted.

The present invention also refers to a capsule holder (generally denoted above as second holder). This capsule holder comprises a base body with a substantially cup-shaped capsule receptacle for receiving a capsule comprising an extractable food product. It may furthermore comprise a handle which is connected to the main body. The handle may be designed in the form of a grip in order to facilitate the user to grab the capsule holder by hand. The capsule holder furthermore comprises a holder lid for opening and closing the capsule receptacle, such that the capsule receptacle and the holder lid together define a sealed chamber. The holder lid of the capsule holder is herein therefore also denoted as stud plate. Still further, the presented capsule holder comprises an ejection mechanism for mechanically ejecting a capsule that is received in the capsule receptacle.

The ejection mechanism allows the user to easily eject used capsules. This has the following advantages: Due to the high pressures that may occur during the brewing process, the capsules may slightly deform or extend within the capsule receptacle, so that the capsule may get stuck in the capsule receptacle and might be hard to remove by hand. Further, a direct contact between the user's hands and the capsules may be prevented. This enables an easy and hygienic handling of the capsule holder.

It is to be noted that the capsule holder according to the present invention is a portable, hand-held holder, i.e. a non-integrated holder. In other words, the portable capsule holder according to the present invention is not integrated into the hot beverage (coffee) machine, but is exchangeable. The portable capsule holder may therefore also be considered as a kind of adapter. The outer contours of the portable capsule holder, especially the outer contours of the base body and the holder lid are configured to be received in a holder receptacle that is arranged in the holder receptacle of the beverage machine.

According to an embodiment, the ejection mechanism of the portable capsule holder comprises a lever and a activation element for moving the lever, wherein the lever is configured to engage a flange of the capsule in order to eject it. The user thus only has to activate the activation element in order to eject a used capsule after the coffee or espresso coffee has been brewed. The activation element preferably comprises a button. In practice this means that after the coffee has been brewed, the user takes out the portable capsule holder, pushes or pulls a button and thereby ejects the capsule, e.g. over a bin. A new capsule may then be inserted into the capsule receptacle of the portable capsule holder. The mentioned lever that engages the flange of the capsule as soon as the push button is activated may either be coupled to the button in a direct or an indirect manner. For example, it is conceivable to arrange a gear in between these two parts that translates the movement of the button into the movement of the lever. However, the button may also be directly coupled to the lever.

According to a further embodiment, the holder lid is connected to the base body via a hinge, and the ejection mechanism is not only configured to eject the capsule, but also configured to open the holder lid upon activation of the activation element. In this case, the lever of the ejection mechanism may have two functions, ejecting the capsule by engaging the capsule flange and pushing it out of the holder's receptacle as well as opening the lid upon activation of the push button. Whereas it is also conceivable to realize the base body of the capsule holder and the lid/stud plate as two separate parts, such an integrated configuration further facilitates the handling for the user.

According to a further embodiment, the activation element is spring-loaded by means of a first spring element, wherein the activation element comprises a push button, a slider or two beams that are arranged at a handle of the portable capsule holder and may be pushed towards each other. The term "first spring element" is herein only used to differentiate this spring element from other (second and third) spring elements that will be explained further below. The first spring element preferably forces the push button, the slider or the two beams (respectively) and the lever back into their inactivated position, meaning the position where an inserted capsule is not ejected and the holder lid/stud plate is in its closed position. This embodiment further facilitates the handling for the user, since he/she only has to press the button, shift the slider or push the two beams towards each other to eject the capsule and/or open the holder lid, whereas the holder lid closes automatically after releasing the button, the slider or the two beams (respectively). The above-mentioned two beams may be integrated into the handle of the portable capsule holder. According to an embodiment, these two beams are arranged at the sides of the handle, such that the two beams may be pressed towards each other by pressing the handle from both sides sideways together. Such a "sideways" arrangement of the activation element provides the advantage that the holder lid/stud plate may be opened in a more ergonomical manner, which is especially advantageous when having to hold the portable capsule holder upside-down to enter a new capsule.

According to a further embodiment, the base body comprises two separate parts, a first body part and a second body part, which are connected to each other via a second spring element. The two body parts are therefore moveable relative to each other. The second spring element functions as an expansion element that forces the two body parts away from each other up to a predefined mechanical bed stop. The second spring element may also comprise a plurality of separate spring elements. This has the main advantage that the holder lid is slightly pre-loaded when the portable capsule holder is inserted into the brewing unit and the lid is closed. This especially improves the sealing between the holder lid and the base body of the capsule holder, since the base body will be slightly compressed when the lid is closed, so that an initial force is applied that is sufficient enough to provide an initial sealing. This prevents the injected liquid to leak through the contact surfaces.

According to a further embodiment of the portable capsule holder, the base body comprises a sealing element that is arranged between the first and the second body part. This sealing element acts as a kind of pressure compensator. As soon as liquid is injected into the capsule, the pressure within the brewing chamber will significantly increase. The two parts of the base body of the capsule holder, i.e. the first body part and the second body part, will thus slightly move apart from each other. The mentioned sealing element then compensates the movement of the first body part relative to the second body part, such that the sealing is maintained.

According to a further embodiment, the portable capsule holder further comprises one or more piercing elements for piercing the capsule. These piercing elements may be used to puncture the capsule and punch one or more holes into the bottom side of the capsule. This allows using capsules that do not comprise any pre-perforated openings in their bottom sides. Such piercing elements may also improve the entry of the fluid into the capsule interior.

In case such piercing elements are provided, it is preferred that the piercing elements are arranged at a screen plate which covers the base body of the portable capsule holder. Said screen plate is arranged at the opposite side of the holder lid. In other words, the screen plate is arranged on the top side of the holder's base body and the holder lid is arranged at the bottom side of the holder's base body. In addition to the piercing elements the screen plate comprises one or more openings through which the liquid may be inserted into the capsule receptacle and then into the capsule.

The base body preferably comprises a second body part that is connected to the screen plate via a third spring element. The screen plate is, in other words, spring loaded, such that it will move downwards as soon as the lid of the brewing unit is closed and pressed against the screen plate. This downward movement of the screen plate forces the one or more piercing elements against the bottom side of the capsule. The capsule is thus pierced as soon as the lid of the brewing unit is closed. The third spring element also provides a pretension of the screen plate such that a good sealing effect is established between the portable capsule holder and the lid of the brewing unit. This ensures that the liquid directly enters the capsule holder via the one or more openings provided in the screen plate and also prevents the liquid from flowing around the capsule without entering it.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
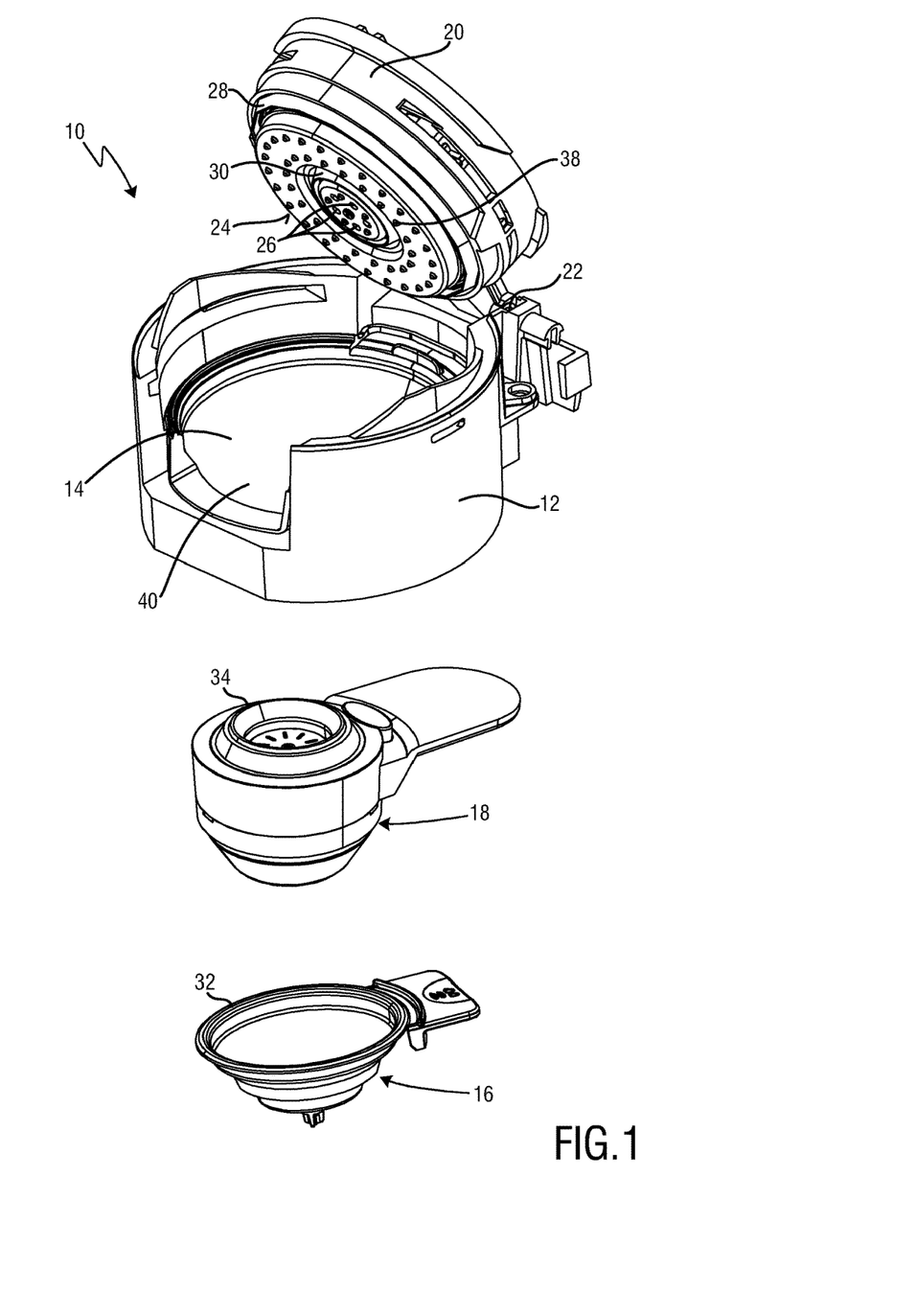
FIG. 1 shows a perspective view of a brewing unit, a first portable holder and a second portable holder of a beverage machine according to an embodiment of the present.

FIG. 1 shows an embodiment of a brewing unit 10 of a beverage machine according to the present invention. This brewing unit 10 may be particularly used in a single-serve coffee and/or espresso coffee machine that allows to extract coffee either from soft pads or from capsules. The remaining parts that are usually comprised in such a single-serve coffee and/or espresso coffee machine are for simplicity reasons not shown. In addition to the brewing unit 10, such single-serve coffee and/or espresso coffee machines usually comprise a liquid tank, a liquid supply including pumps for supplying the liquid to the brewing unit, a heater for heating the liquid before supplying it to the brewing unit as well as one ore more controllers for controlling the liquid supply and/or the heater Of course, the machine may also comprise several heaters that may be arranged either in parallel or in series.

Since the focus of the present invention is on the brewing unit 10 as well as on the different types of pad and capsule holders that may be inserted into the brewing unit 10, the figures explained in the following mainly refer to these essential features.

FIG. 1 shows in the upper part an embodiment of the brewing chamber 10 according to the present invention. This brewing chamber 10 comprises a main body 12 which forms the lower part of the brewing chamber 10. The interior of the main body 12 comprises a hollow 14 for receiving different types of of portable pad or capsule holders holders 16, 18. An embodiment of a first holder 16 and a second holder 18 is shown in the lower part of FIG. 1. The first holder 16 is designed for soft pads in which an extractable food product (e.g. ground coffee) is embedded. The second holder 18 is designed for capsules that encapsulate the extractable food product.

The design of the hollow 14 and the portable holder 16, 18 is chosen such that both holders, the pad holder 16 and the capsule holder 18, may be selectively inserted into the brewing chamber 10 without any additional adapter. This makes it possible to use one and the same single-serve coffee and/or espresso coffee machine with soft pads as well as with capsules.

Figure 2:
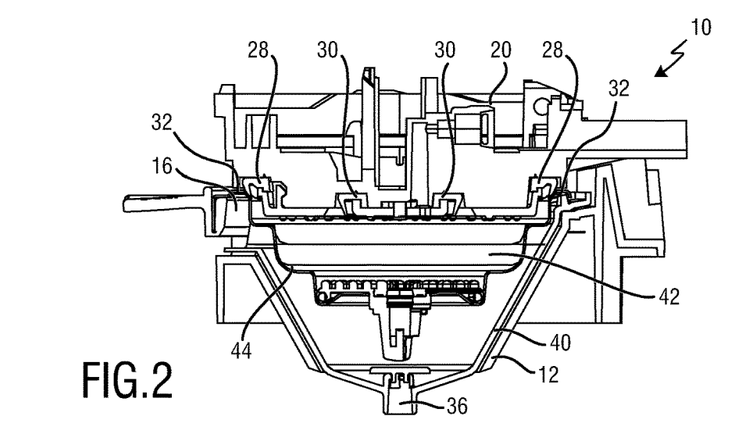
FIG. 2 shows a cross-section of the brewing unit of the beverage machine, wherein the first holder is inserted into the brewing unit.
Figure 3:
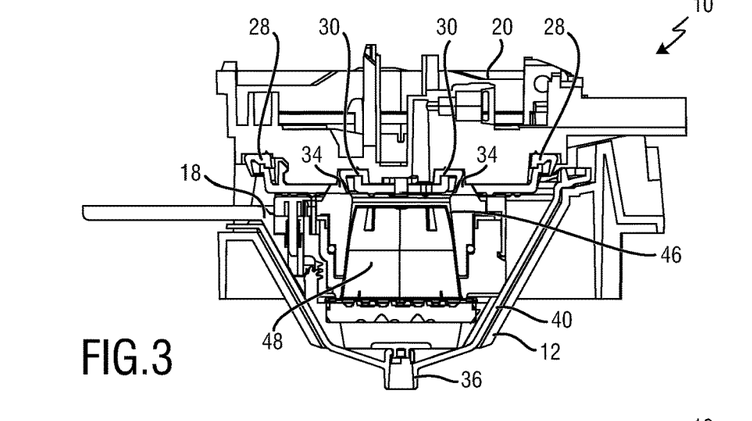
FIG. 3 shows a cross section of the brewing unit of the beverage machine, wherein a first embodiment of the second holder is inserted into the brewing unit.
Figure 4:
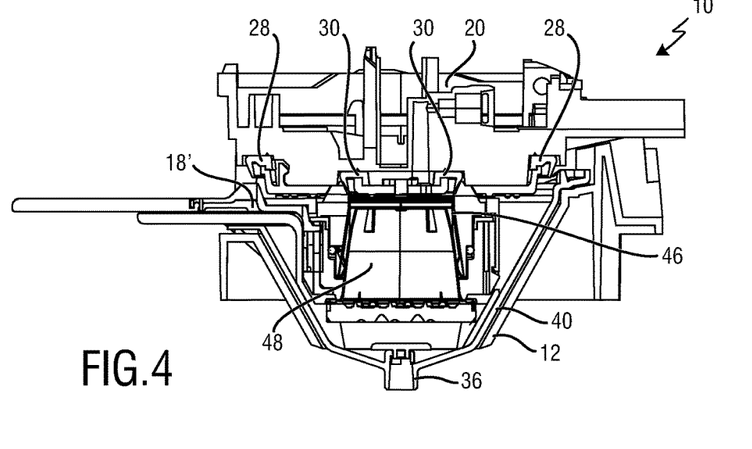
FIG. 4 shows a cross section of the brewing unit of the beverage machine, wherein a second embodiment of the second holder is inserted into the brewing unit.

The brewing unit 10 further comprises a lid 20 that is connected to the main body 12 via a hinge 22. The lid 20 thus allows to open and close the hollow 14. When the lid 20 is open (as shown in FIG. 1), one of the holders 16, 18 may be placed in the hollow 14. When the lid 20 is closed (as shown in FIGS. 2 to 4), the lid 20 seals the brewing unit 10 to the exterior, such that the beverage (e.g. coffee and/or espresso coffee) may be brewed.

On the bottom side 24 of the lid 20, a plurality of liquid supply openings 26 is arranged. These liquid supply openings are connected with the liquid supply and serve for injecting the liquid (preferably hot water) into the interior of the brewing unit 10 as soon as the lid 20 is closed and the brewing process is started. The lid 20 furthermore comprises two sealing members, a first sealing member 28 and a second sealing member 30. Both sealing members 28, 30 are arranged on the bottom side 24 of the lid 20. These sealing members 28, 30 seal a brewing chamber within the brewing unit 10 during the coffee brewing process.

In the embodiment shown in FIG. 1, both sealing members 28, 30 are realized as circular sealing rings that are concentrically arranged to one another. However, it shall be noted that depending on the shape of the lid 20 these sealing members 28, 30 do not necessarily have to be circular sealing rings, but could be also realized as rectangular or quadratic sealings. It is also not mandatory, but preferred, that the two sealing members 28, 30 are arranged concentrically to each other. Both sealing members 28, 30 are preferably integrated into the lid 20. However, this does not mean that they are not replaceable.

The two sealing members 28, 30 form one of the core features of the present invention. The first sealing member 28 seals the brewing chamber when the first holder 16 is inserted into the brewing unit 10. The second sealing member 30 does in this case not have any sealing function. The second sealing member 30 is only in action when the second holder 18 is inserted into the brewing unit 10. In this case, the first sealing member 28 does not contribute then to seal the brewing chamber. This means that each of the two sealing members 28, 30 that are integrated into the lid 20 has a different function, the first sealing member 28 is important when the first holder 16 is used, and the second sealing member 30 is important when the second holder 18 is used.

The first sealing ring 28 has a larger diameter, i.e. encircles a larger area of the bottom side 24 than the second sealing ring 30. The size of the first sealing ring 28 is adapted to the size of an upper flange 32 of the first holder 16, while the size of the second sealing ring 30 is adapted to the size of an upper flange 34 of the second holder 18. The reasons for this will become more apparent by the detailed explanations of FIGS. 2 to 4 further below.

It can be furthermore seen in FIG. 1 that the lid 20 comprises a plurality of protrusions 38 which are also arranged on the bottom side 24 of the lid 20. These protrusions 38 are at least arranged in the space between the first sealing ring 28 and the second sealing ring 30. However, some of these protrusions 38 may also be arranged in the area that is encircled by the second sealing member 30. The protrusions 38 have the shape of small nipples. These nipples serve as distance elements in order to distance the soft pads from the bottom side 24 of the lid 20 when the brewing unit 10 is closed and the soft pads that are inserted into the first holder 16 are used for brewing coffee. If, on the other hand, capsules are used and the second holder 18 is inserted into the brewing unit 10, these nipples 38 do not have a specific function. They are mainly important to prevent the soft pads from sticking to the bottom side 24 of the lid 20 when the lid 20 is opened after the coffee brewing process. In case of a completely flat bottom side 24 of the lid 20, such soft pads would otherwise tend to stick to the lid 20, which makes the handling of the used pads uncomfortable for the user.

It can been furthermore seen in FIG. 1 that the hollow 14 is according to this embodiment at least partly formed by a removable bowl 40 that is inserted into the main body 12. The bowl 40 is also denoted as coffee collector. The bowl 40 serves as a holder receptacle for receiving either the first holder 16 or the second holder 18. As it can be seen in FIGS. 2 to 4, it comprises at its bottom side a central opening 36 through which the brewed coffee (or any other brewed hot beverage) may drizzle out of the brewing unit 10. Even though it would be generally conceivable to integrate said bowl 40 into the brewing unit 10 in a fixed manner, a removable bowl 40 as shown herein has the advantage that it may be cleaned in an easier way after removing it from the machine. The bowl or coffee collector 40 is used in both cases as a holder receptacle, when soft pads are used together with the first holder 16 as well as when capsules are used together with the second holder 18.

FIGS. 2 to 4 show cross-sections of the brewing unit 10 in the different situations, i.e. when a holder 16 of the first type is inserted (see FIG. 2) and when a holder 18 of the second type is inserted (see FIGS. 3 and 4). The second holder 18' that is inserted into the brewing unit 10 in FIG. 4 is a further embodiment of the second holder 18 which regarding the brewing process relies on the same principal as the first embodiment of the second holder 18 shown in FIG. 3. The differences of the two embodiments of the second holder type 18, 18' will be explained further below with reference to FIGS. 5 and 6.

The first situation shown in FIG. 2 illustrates that the first holder 16, which is used for soft pads, contacts the first sealing member 28, while it does not contact the second sealing member 30. The brewing chamber 42, which is in the case of the first holder 16 denoted as "first brewing chamber", therefore becomes quite large. The first brewing chamber 42 is the space between the lid 20 and the pad receptacle 44 of the first holder 16 in which the soft pad may be received. This first brewing chamber 42 is sealed by means of the first sealing element 28. The first sealing element 28 thereto contacts the upper flange 32 of the first holder 16 along its circumference.

The second brewing chamber 46 which denotes the resulting brewing chamber when the holder of the second type 18, 18' is inserted into the brewing unit 10 is in contrast thereto comparatively small. As shown in FIGS. 3 and 4, the second brewing chamber 46 is configured to receive a capsule 48. The second brewing chamber 46 denotes the space between the lid 20 and the capsule receptacle 54 that is formed into the second holder 18, 18'. The second brewing chamber 46 is sealed by means of the second sealing member 30. The second sealing member 30 thereto contacts the upper flange 34 of the second holder 18.

The main advantage of these brewing chambers 42, 46 is the resulting different pressures that occur within them in combination with the therein used consumables. If the first holder 16 is inserted into the brewing unit 10, the injected liquid is distributed over a relatively large area, so that the resulting restriction within the first brewing chamber 42 is relatively low. This is especially advantageous for brewing "regular" coffee. If, on the contrary, the second holder 18, 18' is inserted into the brewing unit 10, the resulting restriction appears to be comparatively high. This is especially suitable for brewing espresso coffee. The user may thus choose whether he wants a "regular" or an espresso coffee, and depending on this decision either use the first holder 16 with a pad or use the second holder 18, 18' with a capsule. Due to the different restrictions of soft pads and capsules, the pressure will be adapted automatically, even if the flow rate of the injected liquid is not adapted. The different sizes of the brewing chambers 42, 46 then helps to account for the different pressures. Due to the higher flow restriction of capsules, it is advantageous to have a smaller sized brewing chamber 46. Otherwise, the system could collapse under too high pressures. On the other hand, due to the lower flow restriction of soft pads, it is advantageous to have a larger sized brewing chamber 42. This allows brewing "regular" coffee and espresso coffee under almost perfect conditions with one and the same device.

In FIGS. 3 and 4 it may be furthermore seen that the capsule 48 is placed upside down in the brewing unit 10, i.e. with the smaller side at the top and the larger side at the bottom. The injected liquid will thus enter the capsule 48 through its smaller side and leave the capsule 48 at its larger side.

Figure 5A:
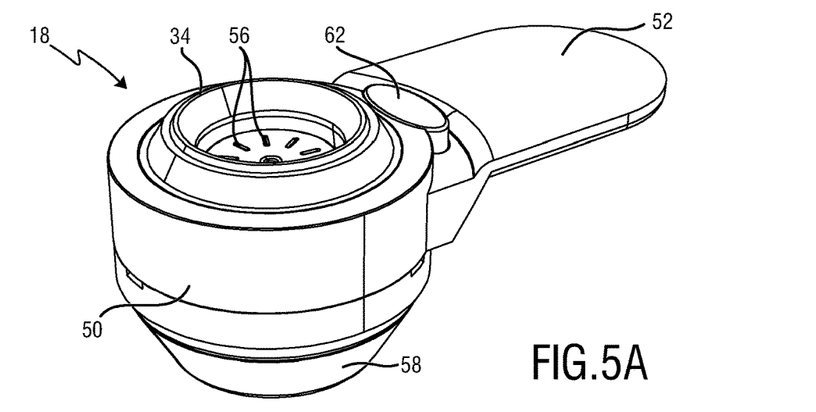
FIGS. 5A-5C show several views of the first embodiment of the second holder that is shown in FIG. 3 in the inserted state.
Figure 5B:
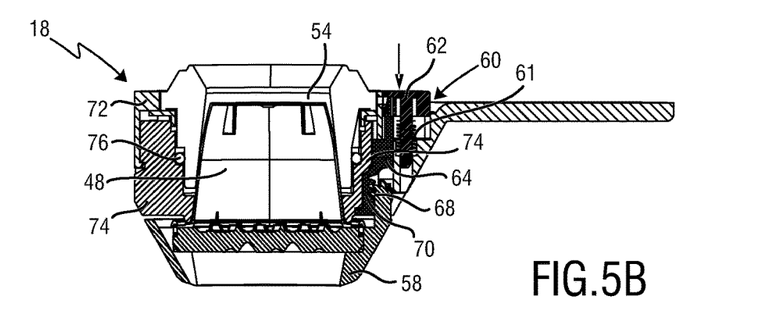
Figure 5C:
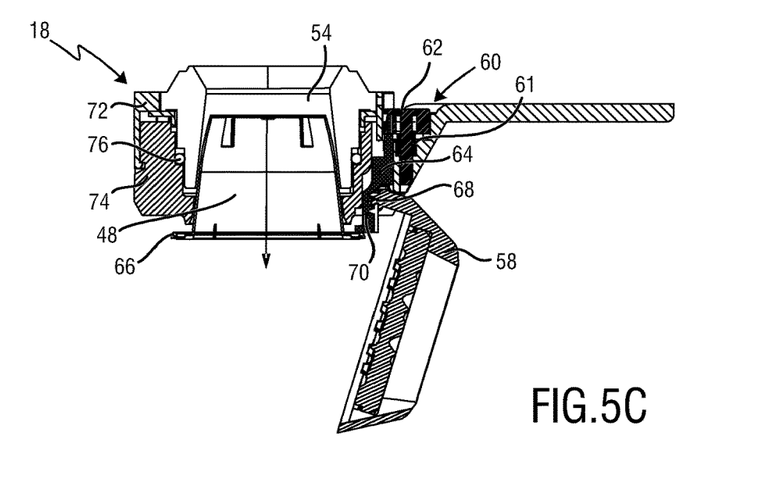
Figure 7A:
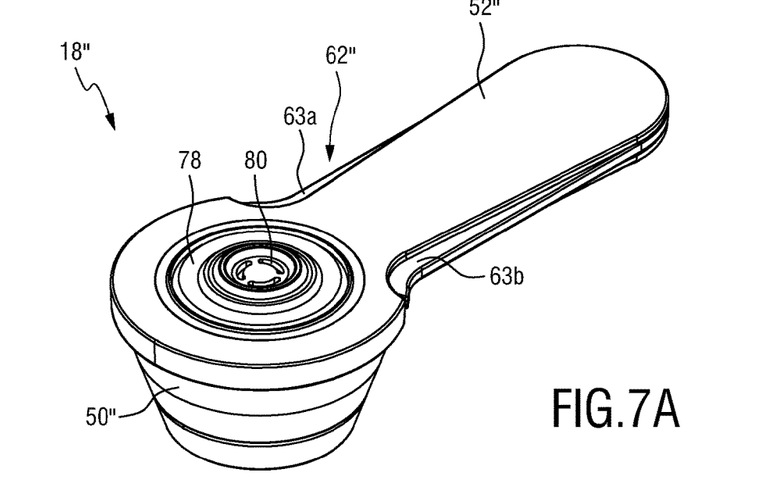
FIGS. 7A-7D show several views of the third embodiment of the second holder.
Figure 7B:
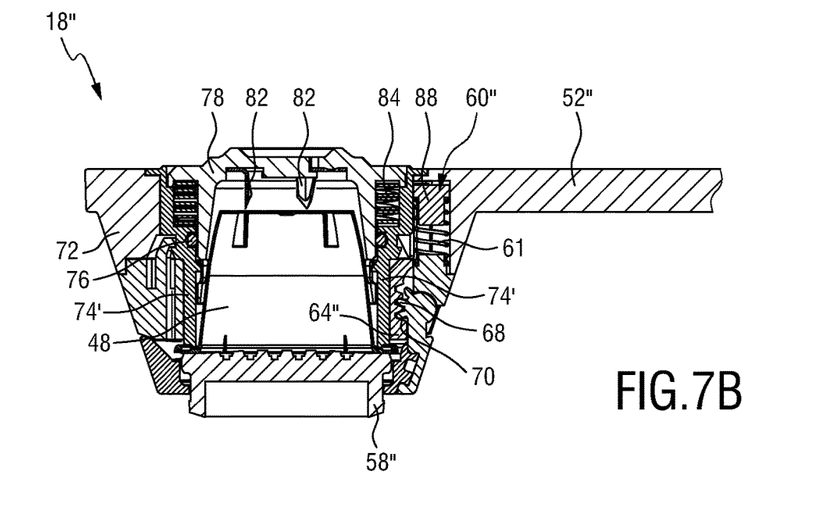
Figure 7C:
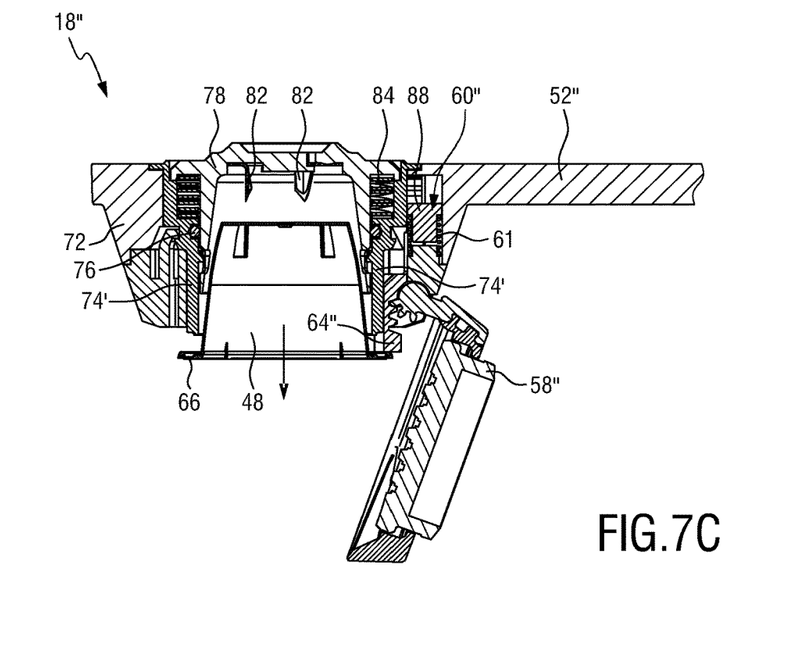
Figure 7D:
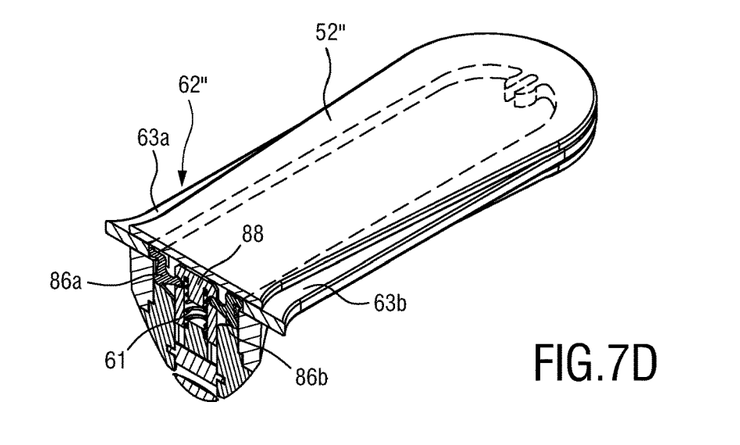

FIGS. 5A-5C show the first embodiment of the second holder 18 in detail. According to this embodiment, the second holder 18 comprises a base body 50 which is integrally formed with a handle 52. Inside the base body 50, a substantially cup-shaped capsule receptacle 54 is provided that is adapted to receive the capsule 48. As mentioned above, the capsule 48 is inserted into this capsule receptacle 54 upside-down. As it can be seen in FIG. 5A, the bottom side of the capsule 48 in this embodiment comprises a plurality of pre-perforated openings 56. When pressurized liquid is applied the liquid may seep through these opening 56. Alternatively, the bottom side of the capsule 48 may be actively pierced or punctured if no pre-perforated openings 56 are foreseen in the capsule (see embodiments shown in FIGS. 7A-7D and 8A-8C). The top of the capsule receptacle 54 may in this alternative case be covered with a screen plate 78 (see e.g. FIGS. 7A and 8A) through which the liquid is inserted into the capsule receptacle 54 and into the capsule 48. Such a screen plate 78 may comprise at least one puncture or piercing element 82 at its bottom side for puncturing the capsule 48 and punching one or more holes into the bottom side of the capsule 48. Instead of providing an extra screen plate 78, such puncture or piercing elements 82 could generally also be arranged at the bottom side 24 of the lid 20.

The capsule receptacle 54 is covered on its bottom side by means of a holder lid 58. This holder lid 58 is in the following also denoted as stud plate 58. According to the first embodiment shown in FIG. 5, this stud plate 58 is connected to the base body 50 of the second holder 18, e.g. by means of a hinge.

The portable holder 18 further comprises an ejection mechanism 60 for mechanically ejecting the capsule 48 after usage. This ejection mechanism comprises a push button 62 and a lever 64. The push button 62 is mechanically connected to the lever 64. By pressing the push button 62, the lever 64 moves downwards, engages the outer flange 66 of the capsule 48, so that the lower end of the lever 64 pushes the capsule 48 out of the capsule receptacle 54 (see FIG. 5C).

As it can be furthermore seen in FIGS. 5B and 5C, the ejection mechanism 60 is according to this embodiment of the holder 18 also configured to open the lid/stud plate 58. Upon activation of the push button 60, the stud plate 58 rotates around its hinge (not shown) with which it is connected to the base body 50. The linear movement of the lever 64 is translated into a rotational movement of the stud plate 58 via a rack and pinion gear. The stud plate 58 comprises a gear pinion 68 and the lever 64 comprises a gear rack 70. In this way, the capsule 48 may be easily ejected out of the portable capsule holder by simply pressing the push button 62. In order to automatically close the stud plate 58 after pressing the push button 62, the push button is spring-loaded by means of a first spring element 61.

Figure 6A:
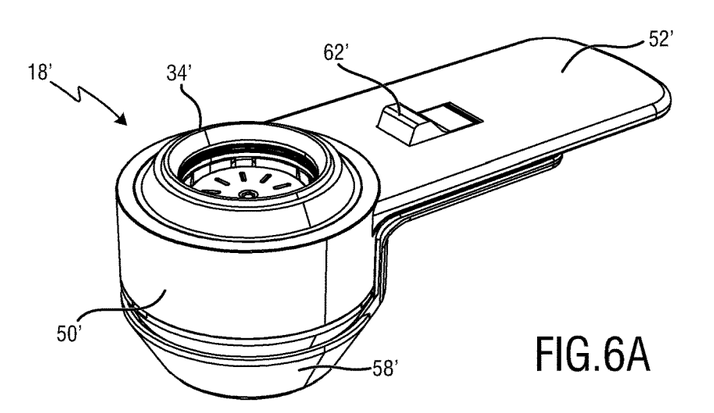
FIGS. 6A-6C show several views of the second embodiment of the second holder that is also shown in FIG. 4 in the inserted state.
Figure 6B:
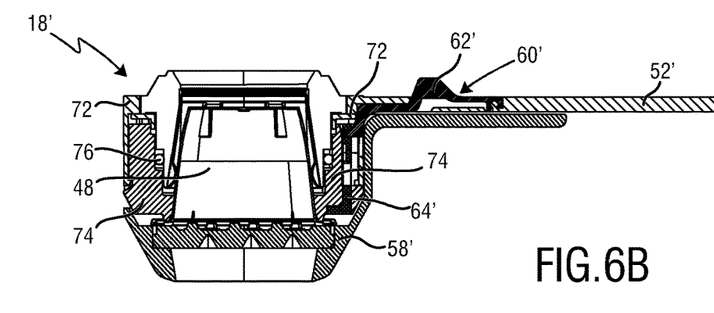
Figure 6C:
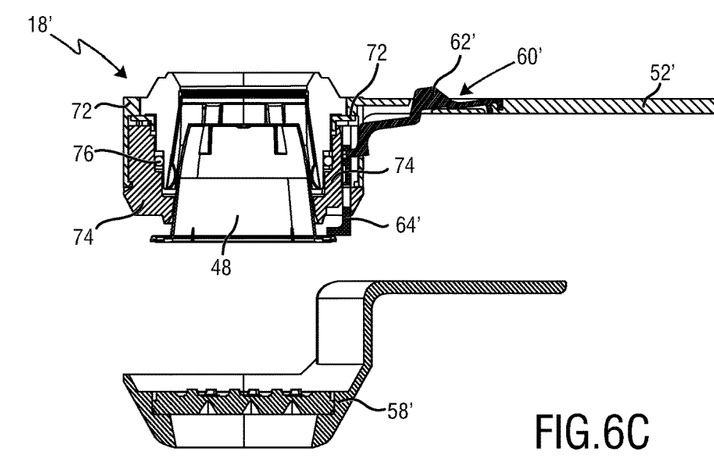

FIGS. 6A-6C show a second embodiment of the portable capsule holder 18 which is denoted by reference numeral 18'. One of the main differences compared to the first embodiment 18 is that the stud plate 58' is in this case realized as a separate part that is not fixedly connected to the base body 50' of the holder 18'. During usage of this holder 18', the stud plate 58' may thus stay in the bowl/holder receptacle 40 of the brewing unit 10 until the user decides to change to soft pads and inserts the first holder type 16 into the brewing unit 10.

Furthermore different is the ejection mechanism 60'. The ejection mechanism 60' is only used to eject the capsule 48 but, in contrast to the ejection mechanism 60 shown in FIGS. 5A-5C, not to open the stud plate 58'. The stud plate 58' may be removed by hand according to the second embodiment.

Still further, it may be seen that the push button 62' slightly rotates upon activation, but still moves the lever 64' in a rectilinear motion.

It shall be also noted that the base body 50, 50' is according to both embodiments shown in FIGS. 5 and 6 divided in at least two separate parts 72, 74. The first body part 72 forms the upper part of the base body 50, and the second body part 74 forms the lower part of the base body 50. The two body parts 72, 74 are preferably connected to each other via one or more spring elements (not shown). These spring elements push the two parts 72, 74 away from each other. The spring elements thus function as expansion elements. This has the main advantage that the stud plate 58, 58' is slightly pre-loaded when the portable capsule holder 18, 18' is inserted into the brewing unit 10 and the lid 20 is closed. This especially improves the sealing between the stud plate 58 and the second base body part 74, since the base body 50 will be slightly compressed when the lid 20 is closed.

The base body 50, 50' further comprises a sealing element 76 that is arranged between the first and the second body part 72, 74. This sealing element 76 acts as a kind of pressure compensator. As soon as liquid is injected into the capsule 48, the pressure within the brewing chamber will significantly increase. The first body part 72 and the second body part 74 will thus slightly move apart from each other. The sealing element 76 then compensates the movement of the first body part 72 relative to the second body part 76, such that the sealing is maintained.

Still further, it shall be noted that stud plate 58, 58' could also be an integrated part of the brewing unit 10, e.g. of the bowl 40 of the brewing unit 10. The above-mentioned spring elements do also not necessarily need o be integrated into the portable capsule holder 18, but may also be integrated into the lid 20 and/or into the bowl 40 of the brewing unit 10.

FIGS. 7A-7D show a third embodiment of the portable capsule holder 18 which is denoted by reference numeral 18'''. This third embodiment is similar to the first embodiment shown in FIGS. 5A-5C. The following explanations therefore only include the differences to the above-mentioned first embodiment. Similar or the same parts are denoted with the same reference numerals as before.

One of the main differences relates to the application of one or more piercing elements 82 that are used to pierce one or more holes into the bottom side of the capsule 48. These piercing elements 82 are arranged at a bottom side of a screen plate 78, which bottom side faces towards the interior of the capsule receptacle 54. The screen plate 78 itself is coupled to the base body 50'' of the capsule holder 18'' and arranged opposite the holder lid/stud plate 58''. It comprises one or more openings 80 through which liquid emanating form the lid 20 of the brewing unit 10 may enter the capsule holder 18''.

The capsule holder 18'' further comprises a third spring element 84 that is arranged between the screen plate 78 and a second body part 74' of the base body 50''. This third spring element 84 provides a pretension of the screen plate 78 such that a good sealing effect is established between the portable capsule holder 18'' and the lid 20 of the brewing unit 10. This ensures that the liquid directly enters the capsule holder 18'' via the one or more openings 80 provided in the screen plate 78 and also prevents the liquid from flowing around the capsule 48 without entering it. As it may be seen from FIG. 7B, the capsule 48 is not pierced (at least not necessarily) as soon it is entered into the capsule holder 18'' and the stud plate 58'' is closed, but only gets pierced by the piercing elements 82 as soon as the lid 20 of the brewing unit 10 is closed. Closing the lid 20 will force the screen plate 78 downwards, wherein the spring element 84 is compressed and the capsule 48 gets pierced.

Together with the sealing element 76, which is according to this embodiment arranged between the screen plate 78 and the second body part 74', the spring element 84 acts as a kind of pressure compensator. As soon as liquid is injected into the capsule 48, the pressure within the brewing chamber will significantly increase. The screen plate 78 and the second body part 74' will thus slightly move apart from each other. The sealing element 76 and the spring element 84 then compensate the movement of the screen plate 78 relative to the second body part 74', such that the sealing is maintained.

The ejection mechanism 60'' is also slightly different compared to the first embodiment shown in FIGS. 5A-5C. Even though the basic principle of ejecting the capsule 48 by means of a moveable lever 64'' and concurrently opening the stud plate 58'' basically stays the same as explained before with reference to the first embodiment of the capsule holder 18, the activation element 62'' for moving the lever 64'' is modified. The differences may be best seen in FIGS. 7A, 7C and 7D. The activation element 62'' according to the third embodiment of the capsule holder 18'' comprises two beams 63a and 63b that are integranted into the handle 52''. These two beams 63a, 63b are arranged at the sides of the handle 52'', such that the two beams 63a, 63b may be pressed towards each other by pressing the handle 52'' from both sides sideways together. Pressing the two beams 63a, 63b towards each other causes two transmission elements 86a, 86b to rotate about their respective axes. A rotation of the two transmission elements 86a, 86b causes moving part 88 to shift downwards in a translational manner and compressing the spring element 61 (see FIG. 7D). The moving part 88 is integrally connected to the lever 64'' that ejects the capsule 48. Preferably it is one and the same part. Similar as explained before with reference to FIGS. 5A-5C, a movement of the lever 64'' also causes the stud plate 58'' to pivot around its hinge with which it is connected to the base body 50'' of the capsule holder 18'', such that the capsule 48 may be removed.

Figure 8A:
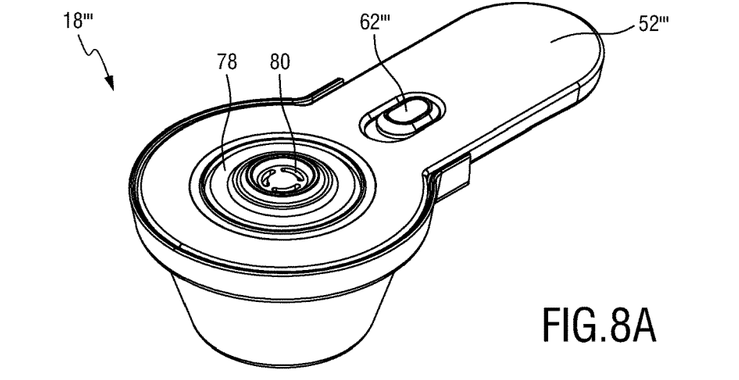
FIGS. 8A-8C show several views of the fourth embodiment of the second holder.
Figure 8B:
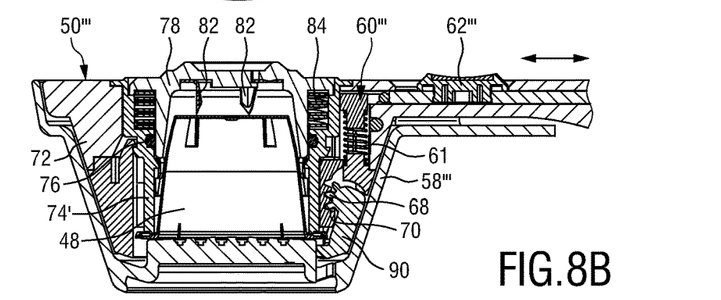
Figure 8C:
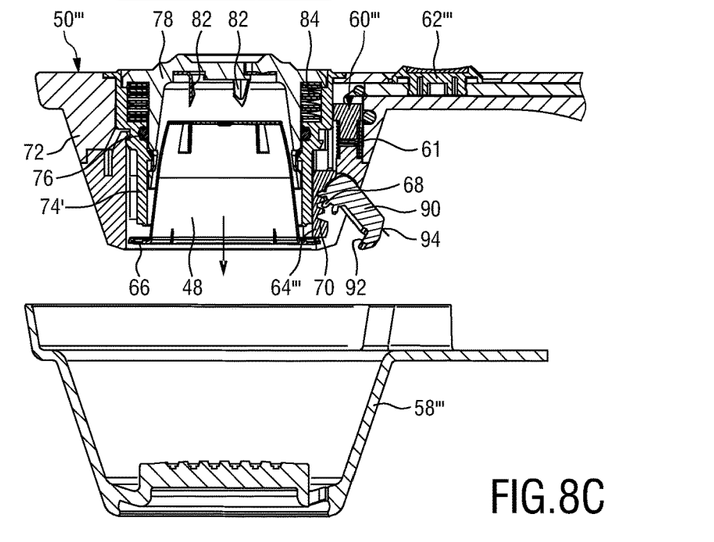

FIGS. 8A-8C show a fourth embodiment of the portable capsule holder 18 which is denoted by reference numeral 18'''. This fourth embodiment is similar to the second embodiment shown in FIGS. 6A-6C. The following explanations therefore only include the differences to the above-mentioned second embodiment. Similar or the same parts are denoted with the same reference numerals as before.

In contrast to the second embodiment, the fourth embodiment comprises a screen plate 78 with piercing elements 82, and a spring element 84 arranged between the second body part 74' and the screen plate 78, similar as explained before with reference to the third embodiment.

The capsule holder 18''' additionally comprises a flap 90 that is connected to the base body 50''' by means of a hinge (not shown). This flap 90 prevents the capsule 48 from directly falling out of the capsule receptacle 54 as soon as the capsule holder 18''' is taken out of the brewing unit 10.

The holder lid 58''' may thus remain in the brewing unit 10 when the capsule holder 18''' is taken out to replace the capsule 48 with a new one. The flap 90 comprises a hook 92 that engages the outer flange of the capsule 48 as long as the ejection mechanism 60''' is not activated. This hook 90 holds the capsule 48 within the capsule receptacle 54 and prevents it from falling out. The flap 90 is coupled to the ejection lever 64''' by means of gear pinion 68 that is arranged at the flap 90 and engages a gear rack 70 that is arranged at the ejection lever 64'''. Activating the ejection mechanism 60''' thus moves the ejection lever 64''' downwards (similar as explained before) and at the same time causes the flap 90 to pivot outwardly and to thereby release the capsule 48. Instead of a push button 62, 62', the ejection mechanism 60''' according to this embodiment comprises a slider 62''' that may be shifted forth and back (as indicated by the arrow in FIG. 8B).

It shall be also noted that the flap 90 further comprises an inclined surface 94 at its bottom, such that a new capsule 48 may simply be inserted into the capsule holder 18''' without having to activate the slider 62'''. Due to the inclined surface 94 and the pivoting arrangement of the flap 90, the flap 90 will simply "click-in" the new capsule 48.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A beverage machine, comprising:
   a brewing unit with (i) a main body defining a hollow for receiving different types of portable pad and/or capsule holders, and (ii) a lid connected to the main body for opening and closing the hollow;
   a first holder for receiving a first type of pad or capsule which encapsulates an extractable food product; and
   a second holder for receiving a second type of pad or capsule which encapsulates an extractable food product;
   wherein either the first or the second holder may be selectively placed in the hollow, and wherein the lid comprises (i) a first sealing member which is configured to seal a first brewing chamber between the lid and the first holder, when the first holder is inserted into the hollow, and (ii) a second sealing member which is different from the first sealing member and configured to seal a second brewing chamber between the lid and the second holder, when the second holder is inserted into the hollow, and
   wherein the first and the second sealing members are separated from each other by a portion of a bottom side of the lid.

2. The beverage machine as claimed in claim 1, wherein the first brewing chamber is defined in a space between the lid, the first holder and the first sealing member when the first holder is inserted into the hollow, and wherein the second brewing chamber is defined in a space between the lid, the second holder and the second sealing member when the second holder is inserted into the hollow.

3. The beverage machine as claimed in claim 1, wherein the first holder is configured to receive a pad with an extractable food product, and wherein the second holder is configured to receive a capsule with an extractable food product.

4. The beverage machine as claimed in claim 1, wherein the first and the second sealing members are arranged on the bottom side of the lid, and wherein the first sealing member encircles a larger area of the bottom side than the second sealing member.

5. The beverage machine as claimed in claim 1, wherein the first and the second sealing members are concentrically arranged to one another.

6. The beverage machine as claimed in claim 1, wherein the lid comprises at least one liquid supply opening that is surrounded by the second sealing member.

7. The beverage machine as claimed in claim 1, wherein the lid is connected to the main body via a hinge.

8. A portable capsule holder for a beverage machine, the beverage machine comprising:
   a brewing unit with (i) a main body defining a hollow for receiving different types of portable pad and/or capsule holders, and (ii) a lid connected to the main body for opening and closing the hollow;
   a first holder for receiving a first type of pad or capsule which encapsulates an extractable food product; and
   a second holder for receiving a second type of pad or capsule which encapsulates an extractable food product;
   wherein either the first or the second holder may be selectively placed in the hollow, and wherein the lid comprises (i) a first sealing member which is configured to seal a first brewing chamber between the lid and the first holder, when the first holder is inserted into the hollow, and (ii) a second sealing member which is different from the first sealing member and configured to seal a second brewing chamber between the lid and the second holder, when the second holder is inserted into the hollow,
   wherein the portable capsule holder comprises:
      a base body which comprises a substantially cup-shaped capsule receptacle for receiving a capsule that encapsulates an extractable food product;
      a holder lid for opening and closing the capsule receptacle; and
      an ejection mechanism for ejecting a capsule that is received in the capsule receptacle.

9. The portable capsule holder as claimed in claim 8, wherein the ejection mechanism comprises a lever and an activation element for moving the lever, wherein the lever is configured to engage a flange of the capsule in order to eject it.

10. The portable capsule holder as claimed in claim 8, wherein the holder lid is connected to the base body via a hinge, and wherein the ejection mechanism is also configured to open the holder lid upon activation of the activation element.

11. The portable capsule holder as claimed in claim 9, wherein the activation element is spring-loaded by means of a first spring element, and wherein the activation element comprises a push button, a slider or two beams that are arranged at a handle of the portable capsule holder and may be pushed towards each other.

12. The portable capsule holder as claimed in claim 8, wherein the base body comprises a first body part and a second body part that are connected to each other via a second spring element.

13. The portable capsule holder as claimed in claim 12, wherein the base body comprises a sealing element that is arranged between the first and the second body parts.

14. The portable capsule holder as claimed in claim 8, further comprising one or more piercing elements for piercing the capsule.

15. The portable capsule holder as claimed in claim 14, wherein the base body further comprises a screen plate having one or more openings through which liquid may be inserted into the capsule receptacle, wherein the screen plate is arranged at a first side of the base body, wherein the holder lid is arranged on a second side of the base body opposite the first side, and wherein the one or more piercing elements are arranged at the screen plate.

16. The portable capsule holder as claimed in claim 15, wherein the base body comprises a second body part that is connected to the screen plate via a third spring element.

17. A beverage machine, comprising:
a brewing unit with (i) a main body defining a hollow for receiving different types of portable pad and/or capsule holders, and (ii) a lid connected to the main body for opening and closing the hollow;
a first holder for receiving a first type of pad or capsule which encapsulates an extractable food product; and
a second holder for receiving a second type of pad or capsule which encapsulates an extractable food product;
wherein either the first or the second holder may be selectively placed in the hollow, and wherein the lid comprises (i) a first sealing member which is configured to seal a first brewing chamber between the lid and the first holder, when the first holder is inserted into the hollow, and (ii) a second sealing member which is different from the first sealing member and configured to seal a second brewing chamber between the lid and the second holder, when the second holder is inserted into the hollow,
wherein the first and the second sealing members are arranged on a bottom side of the lid,
wherein a plurality of protrusions are arranged on said bottom side at least in between the first and the second sealing members.

18. The beverage machine as claimed in claim 17, wherein the lid comprises at least one liquid supply opening that is surrounded by the second sealing member, and wherein the at least one liquid supply opening is arranged at said bottom side.

19. A beverage machine, comprising:
a brewing unit with (i) a main body defining a hollow for receiving different types of portable pad and/or capsule holders, and (ii) a lid connected to the main body for opening and closing the hollow;
a first holder for receiving a first type of pad or capsule which encapsulates an extractable food product; and
a second holder for receiving a second type of pad or capsule which encapsulates an extractable food product, wherein either the first or the second holder may be selectively placed in the hollow, and wherein the lid comprises (i) a first sealing member which is configured to seal a first brewing chamber between the lid and the first holder, when the first holder is inserted into the hollow, and (ii) a second sealing member which is different from the first sealing member and configured to seal a second brewing chamber between the lid and the second holder, when the second holder is inserted into the hollow;
a liquid supply for supplying a liquid to the brewing unit;
a heater for heating the liquid;
a controller for controlling the liquid supply and/or the heater; and
a detector for detecting which type of a holder, the first or the second holder, is inserted into the hollow;
wherein the controller is configured to change the parameters of the liquid supply and/or the heater in dependence on the detected type of holder.

\* \* \* \* \*